United States Patent [19]

Mashino

[11] Patent Number: 4,754,212
[45] Date of Patent: Jun. 28, 1988

[54] VOLTAGE REGULATION SYSTEM FOR AUTOMOTIVE CHARGING GENERATOR

[75] Inventor: Keiichi Mashino, Katsuta, Japan

[73] Assignee: Hitachi, Ltd., Tokyo, Japan

[21] Appl. No.: 71,177

[22] Filed: Jul. 8, 1987

[30] Foreign Application Priority Data

Jul. 9, 1986 [JP] Japan ............................. 61-159634

[51] Int. Cl.⁴ .......................... H02J 7/14; H02P 9/30
[52] U.S. Cl. ........................................ 322/28; 322/73
[58] Field of Search ................. 322/28, 29, 73, 32; 323/235

[56] References Cited

U.S. PATENT DOCUMENTS

| | | | |
|---|---|---|---|
| 3,984,755 | 10/1976 | Lehnhoff et al. | 322/28 |
| 4,219,769 | 8/1980 | MacFarlane et al. | 322/28 |
| 4,385,270 | 5/1986 | Balan et al. | 322/28 |
| 4,533,863 | 8/1985 | Luhn et al. | 322/73 X |
| 4,629,964 | 12/1986 | Ball | 323/235 X |

*Primary Examiner*—R. J. Hickey
*Attorney, Agent, or Firm*—Antonelli, Terry & Wands

[57] ABSTRACT

A voltage regulation system for automotive charging generator comprising an armature winding, a field winding for supplying magnetic fluxes to the armature winding, a diode rectifier for converting the AC output of the armature winding linearly, a power MOS FET switching element connected in series with the field winding for turning on and off the field current, a storage battery charged by the output of the diode rectifier, and a voltage detection circuit for detecting the voltage applied to the storage battery to turn on the power MOS FET switching element when the detected voltage is lower than a predetermined voltage and to turn off the switching element when the voltage applied to the storage battery is higher than the predetermined voltage. The voltage detection circuit includes a comparing circuit D-type flip-flop so as to compare the voltage of the storage battery with a reference voltage, and in accordance with the result of this comparision, generate a signal at the complementary output of the flip-flop for controlling the on and off of the power MOS FET switching element at a time point synchronous with the bottom of the AC output voltage.

14 Claims, 5 Drawing Sheets

VOLTAGE REGULATION SYSTEM FOR AUTOMOTIVE CHARGING GENERATOR

BACKGROUND OF THE INVENTION

The present invention relates to a voltage regulation system for a charging generator, or more in particular, to a voltage regulation system for a charging generator of digital IC type suitable for use on automobiles.

In a conventional voltage regulation system for an automotive charging generator, the output voltage of a generator is divided and compared with a reference voltage to control the on-off operation of a power element.

Also, the specification of U.S. Pat. No. 4,385,270 discloses a system for regulating an output voltage in which a triangular wave of a predetermined frequency is utilized as a reference voltage to control the on-off frequency of a power element.

In the above-mentioned prior art systems, although the on-off frequency of the power element is constant, the on-off switching timing thereof is determined by a field current that changes with an external load or the like. Accordingly, the on-off operation of the power element is accompanied by a sudden change in output voltage and causes a surge voltage, thus inducing such a problem as radio noises.

In recent years, however, with the increase in the electrical load including the power steering system and the like, the output level requirement of the automotive charging generator has been increased. On the other hand, with the improvement in the sensitivity of car radio receivers, etc., more and more attention has been directed to the problem of radio noises of radio receivers operating in medium wave region.

SUMMARY OF THE INVENTION

Accordingly, the object of the present invention is to provide a voltage regulation system for an automotive charging generator in which, in view of the above-mentioned problems, the surge voltage which otherwise would be caused by the on-off operation of a power element for field current control of the charging generator is prevented from being generated, thereby reducing the radio noises generated.

According to the present invention, there is provided a voltage regulation system for an automotive charging generator, in which the rise or fall of an AC voltage generated across the armature winding of the generator is used as a clock signal, and the power element of the voltage regulation system is turned on and off in phase with the clock signal thereby regulating the field current of the generator.

The single-phase voltage of the armature winding of a generator generates an output of a waveform similar to a rectangular wave at a frequency proportional to the rotational speed of the generator. In view of the fact that the voltage across the armature winding of the AC generator undergoes a change at the time of commutation thereof, the switching operation of a power element is controlled for controlling the on-off operation of an excitation current in synchronism with the rise or fall of the voltage. In this type of generator for producing a DC voltage by rectifying the output of an AC generator, the output voltage of the armature winding assumes a minimum value at the time of commutation thereof, and in synchronism with this, the switching of the power element is controlled, whereby the surge voltage generated in switching the power element is reduced, thus dampening the generation of radio noises.

DESCRIPTION OF THE PREFERRED EMBODIMENTS

An embodiment of the present invention will be described below with reference to the accompanying drawings.

Figure 1:
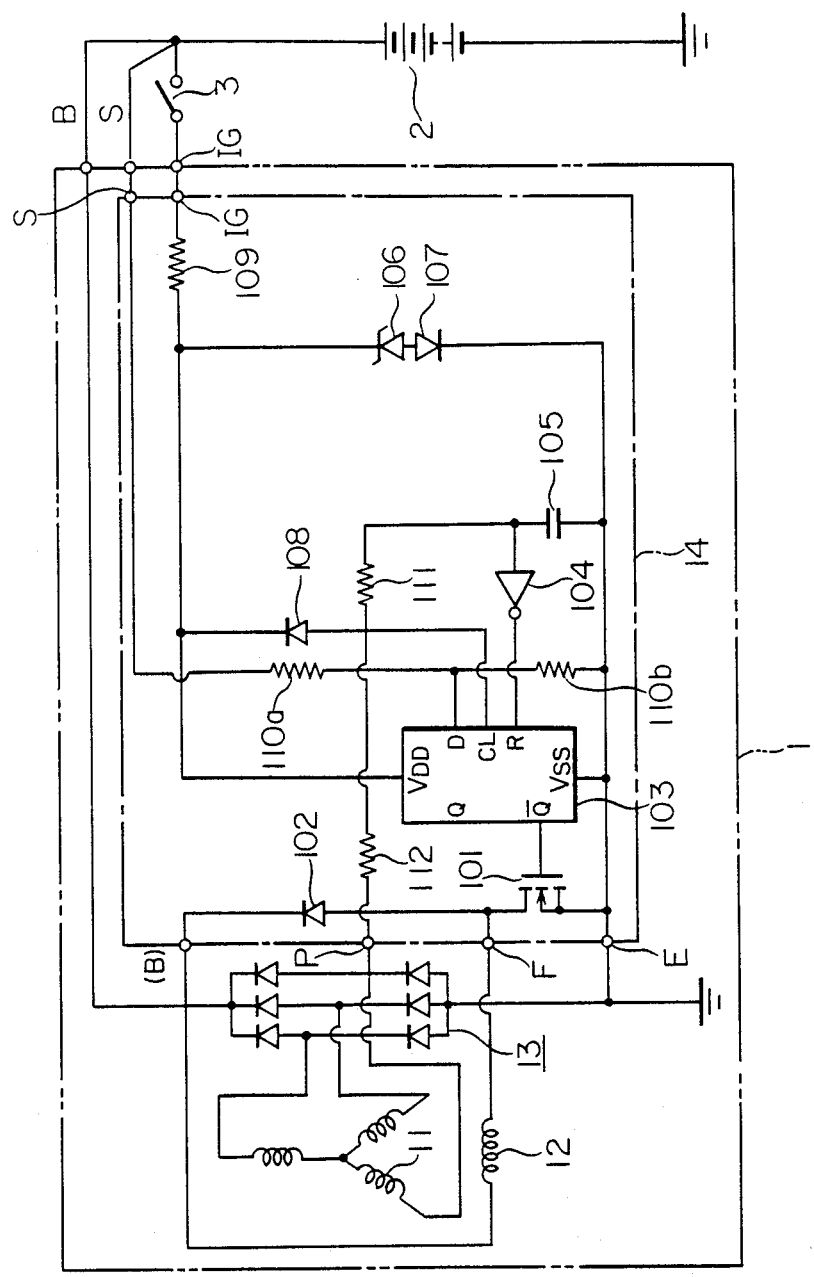
FIG. 1 is a circuit diagram of a charging generator according to an embodiment of the present invention.

In FIG. 1, reference numeral 1 designates a charging generator having built therein an armature winding 11 for generating an AC voltage in synchronism with the engine revolutions, a field winding 12 for supplying field magnetic fluxes to the armature winding 11, a three-phase full-wave rectifier 13 for converting the AC output of the armature winding 11 into direct current, and a voltage regulation system 14. Numeral 2 designates a storage battery, which is charged by the output of the charging generator 1 and supplies power to an external electrical load (not shown). Numeral 3 designates a key switch, which is thrown on for performing the operation of the circuit when the charging generator 11 is in operation.

The aforementioned voltage regulation system 14 includes a power MOS FET (field effect transistor) 101 connected in series to the storage battery 2 and the field winding 12 of the charging generator, a flywheel diode 102 inserted between the terminals B and F, a D-type flip-flop 103 with a $\overline{Q}$ terminal thereof connected to the gate of the power MOS FET 101, a NOT gate 104, a smoothing circuit having a capacitor 105 and a resistor 111, a zener diode 106 making up a constant voltage source, a diode 107, a diode 108, and resistors 109, 110a, 110b and 112.

In the aforementioned configuration, when the key switch 3 is turned on, a voltage from the storage battery 2 is applied to the IG terminal of the voltage regulation system 14, and current is supplied through the resistor 109 to the zener diode 106 and the diode 107. A constant voltage is thus generated and applied to the power terminals ($V_{DD}$, $V_{SS}$) of the D-type flip-flop 103. This D-type flip-flop 103 includes a C-MOS gate arrangement such as MC 14013B of Motorola. Also, the same constant voltage source is supplied to the NOT gate 104 thereby to start the operation of the circuit. The logic inverter or NOT gate 104, together with the resistor-capacitor time circuit combination, i.e. 105 and 111–112, together with the constant voltage circuit elements represents an initialization circuit.

Explanation will be made of the operation of the D-type flip-flop 103. When the clock signal applied to the clock terminal (CL) rises from "0" to "1", the input signal D at the data terminal D and an inverted signal $\overline{D}$ thereof are produced at the Q and $\overline{Q}$ terminals thereof respectively. When the data signal D is "0", for instance, signals Q of "0" and $\overline{Q}$ of "1" are produced with the rise of the clock signal. When D is "1", on the other hand, signals produced are Q of "1" and $\overline{Q}$ of "0", respectively. As seen from this fact, the input signal at the data terminal D is held before the next clock signal CL. When the clock signal CL falls from "1" to "0", however, the Q and $\overline{Q}$ outputs remain unchanged.

When the reset terminal R of the D-type flip-flop is turned to "1", it is reset, thereby keeping the outputs Q and $\overline{Q}$ at "0" and "1", respectively, regardless of the clock signal. According to the embodiment under consideration, this function of the D-type flip-flop is used to control the field current in synchronism with the rise or fall of the AC output voltage of the charging generator or comparison of the battery voltage.

Now, the operation of the voltage regulation system configured as mentioned above will be explained in detail below.

In the case where the generator is not driven, no voltage is generated across the armature winding 11 and no charge build-up is made on the capacitor 105, so that the input terminal of the NOT gate 104 remains "low" (hereinafter expressed as "0"), while the output terminal thereof produces an inverted output of "high" level (hereinafter expressed as "1"). Then, the D-type flip-flop 103 is reset through the reset terminal R thereof, and "1" is produced at the $\overline{Q}$ terminal thereof. As a result, the gate of the power MOS FET 101 is supplied with a voltage and the FET 101 begins to conduct. A current flows from the storage battery 2 through the B terminal of the charging generator 1 to the field winding 12 and the power MOS FET 101 for excitation, thereby making the generator ready for power generation.

Figure 2:
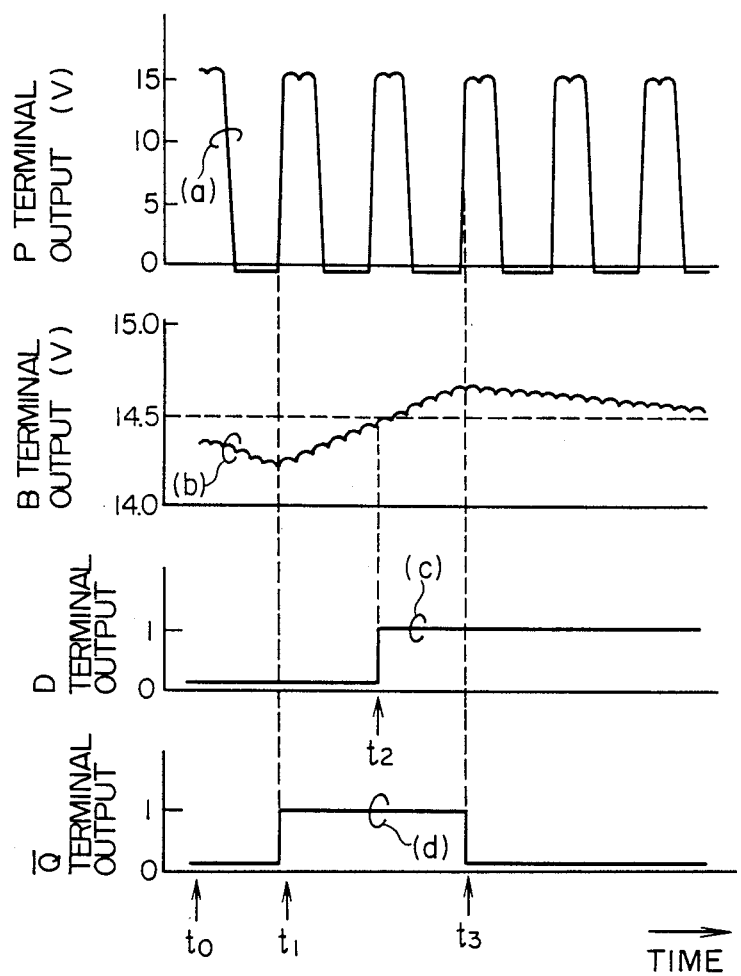
FIG. 2 shows waveforms for explaining the operation of the embodiment shown in FIG. 1.

When the charging generator 1 is driven by the engine (not shown), by contrast, the armature winding 1 is supplied with a rotational magnetic field and generates an AC electromotive force. FIG. 2 shows waveforms produced at various parts according to the embodiment of FIG. 1. FIG. 2(a) shows an example of the voltage waveform generated at the single-phase terminal P of the armature winding 1. When a voltage is generated in this way, the voltage is smoothed in the smoothing circuit including the resistor 111 and the capacitor 105, and a DC voltage is charged across the capacitor 105. The input of the NOT gate 104 is then turned "1", and the output thereof falls to "0", thereby cancelling the reset state of the D-type flip-flop 103. On the other hand, this voltage waveform is connectable to the clock terminal CL of the D-type flip-flop 103 through the resistor 112 and the rise thereof is used as a clock signal.

Generally, the threshold voltage $V_{th}$ of the input circuit of a C-MOS logic gate is known to be about one half of the source voltage. Assuming that the threshold voltage is $V_{th}'$ for the source voltage made up of the zener diode 106 and the diode 107, the relationship between the input voltage $V_D$ of the data input terminal D of the D-type flip-flop and the voltage $V_B$ of the storage battery 2 is given as $$V_D = \frac{R_b}{R_a + R_b} \cdot V_B \quad (1)$$

If $V_B$ becomes $V_B'$ when $V_D$ is equal to $V_{th}'$, the equation (2) below is obtained.

$$V_{B'} = \left(1 + \frac{R_a}{R_b}\right) \cdot V_{th'} \quad (2)$$

where $R_a$ is the resistance value of the resistor 110a, and $R_b$ the resistance value of the resistor 110b. More specifically, if the voltage $V_B$ of the storage battery 2 exceeds $V_{B'}$, "1" is applied to the terminal D of the D-type flip-flop, while when $V_B$ is lower than $V_{B'}$, "0" is applied thereto, whereby the function of voltage regulation is accomplished.

In the case of FIG. 2, the values of $R_a$ and $R_b$ are adjusted to keep $V_{B'}$ at 14.5 V. Also, in FIG. 2, at time point $t_0$, the power MOS FET 101 is off, and the field current is attenuated through the flywheel diode 102, and consequently the output voltage (b) decreases with time. At time point $t_1$, the input at D terminal is "0", and therefore, with the rise of the P terminal voltage (a), the inverted output terminal $\overline{Q}$ of the D-type flip-flop 103 changes from "0" to "1". This is obtained by the function of the D-type flip-flop to hold the previous output until the rise of the clock signal.

The power MOS FET 101 is turned on and the field current is energized, thereby increasing the output voltage (b). At time point $t_2$, $V_B$ exceeds 14.5 V and the input at the D terminal (c) changes from "0" to "1", while the inverted output $\overline{Q}$ (d) is held until the time $t_3$ of arrival of the next clock pulse. At time point $t_3$, the terminal $\overline{Q}$ is inverted and falls to "0", so that the power MOS FET 101 turns off and the field current is attenuated thereby to reduce the output voltage (b). By repeating the above-mentioned operations, the generated voltage that is the B terminal voltage goes up and down around the constant value $V_{B'}$ of 14.5 V, the time average value thereof being equal to $V_{B'}$. In this embodiment, the power MOS FET is switched in the bottom of the output ripple of the waveform (b) as at time points $t_1$ and $t_3$ in FIG. 2, and therefore the field current is energized or cut off when the output current is minimum. As a result, less switching surge is generated, thereby reducing radio noises.

According to the present embodiment, the use of a D-type flip-flop reduces the number of parts making up the voltage regulation system for the generator, thus making it possible to supply the product at low cost. Further, since a C-MOS circuit is used, less current is consumed with smaller heat generation, and therefore the system is more suitable for a circuit packaging in the generator. Also, the embodiment under consideration has the advantage that a clock oscillation circuit is not required unlike the above-mentioned prior art.

Another embodiment of the present invention will be described below with reference to FIG. 3. This embodiment is intended to obviate the problem encountered in the embodiment illustrated in FIG. 1 that in the case where the key switch 3 is thrown on successively with the charging generator stationary, current unnecessarily continues to flow in the field winding 12 thereby to cause an excessive discharge of the storage battery 2.

Figure 3:
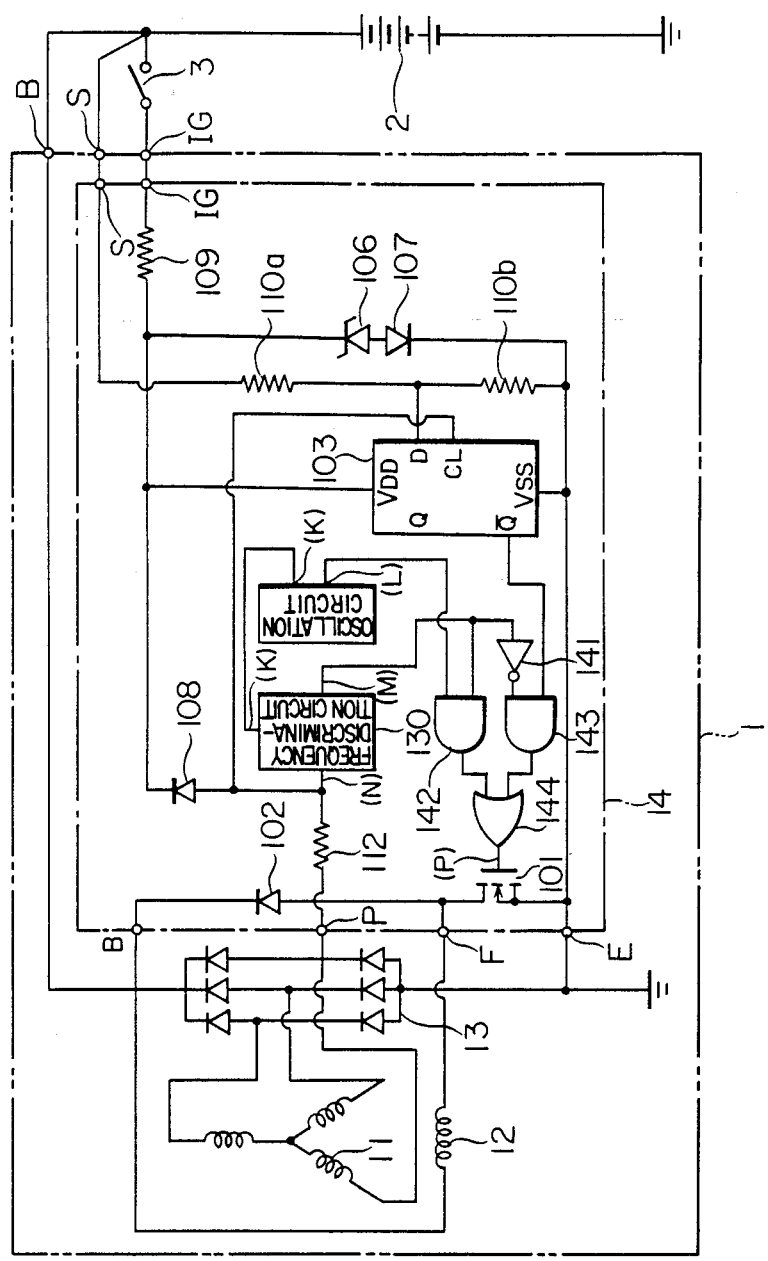
FIG. 3 is a circuit diagram of a charging generator according to another embodiment of the present invention.

In FIG. 3, those component parts identical to those in FIG. 1 are designated by the same reference numerals as the latter and will not be described again. In FIG. 3, numeral 120 designates an oscillation circuit having two output terminals K and L, which will be described in detail later. Numeral 130 designates a frequency discriminator circuit for comparing the frequencies of the inputs K and M, and according to the result thereof, determines the condition of the output M, as the operation thereof is described later. Numeral 141 designates a NOT gate, numerals 142, 143 an AND gate, and numeral 144 an OR gate. The oscillation circuit 120, the frequency discriminator circuit 130, the NOT gate 141, the AND gates 142, 143, and the OR gate 144 are formed of C-MOS gates sharing a common power supply $V_{DD}$, $V_{SS}$ with the D-type flip-flop 103.

Figure 4:
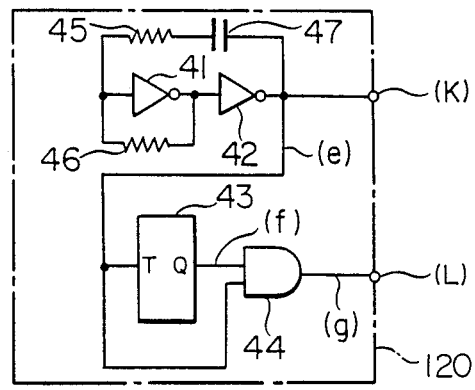
FIG. 4 is a detailed circuit diagram of an oscillation circuit 120 in FIG. 3.
Figure 5:
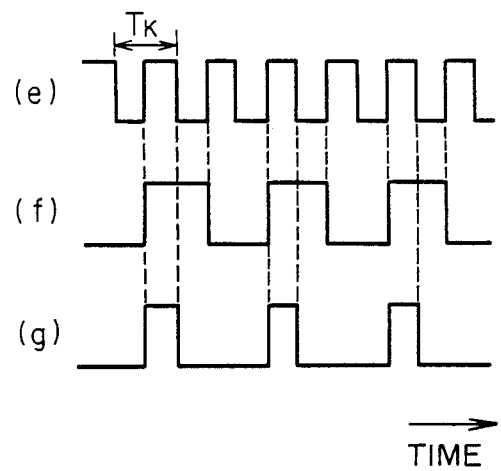
FIG. 5 shows waveforms for explaining the operation of the circuit of FIG. 4.

In this configuration, when the key switch 3 is thrown on, power is supplied to the respective circuits. The oscillation circuit 120 is shown in detail in FIG. 4, and a time chart thereof in FIG. 5. In FIG. 4, numerals 41, 42 designate a NOT gate, numeral 43 a T-type flip-flop with the output terminal Q inverted with the rise of the input at T terminal, and numeral 44 an AND gate. Numerals 45, 46 designate a resistor, and numeral 47 a capacitor. When the NOT gates 41, 42 are subjected to positive feedback, an oscillation waveform as shown in FIG. 5(e) is produced as an output at the terminal K. At the T-type flip-flop 43, the frequency of (e) is divided into one-half thereby to produce the waveform (f). The AND gate 44 produces a logic product of (e) and (f), in the output waveform of a duty factor of one-fourth as shown in FIG. 5(g).

Figure 6:
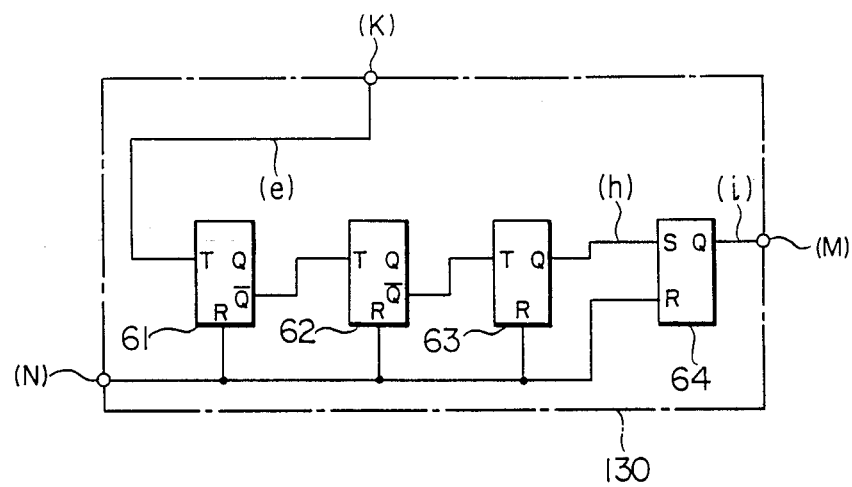
FIG. 6 is a detailed circuit diagram of a frequency discriminator in FIG. 3.
Figure 7:
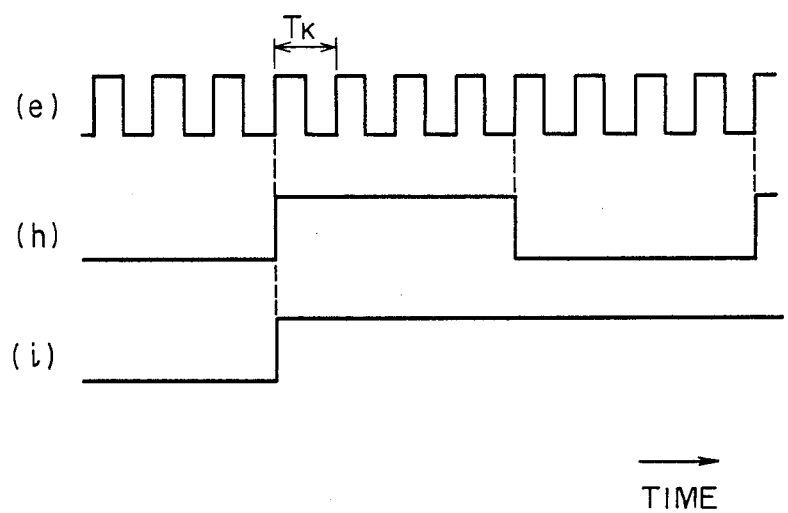
FIG. 7 shows waveforms for explaining the operation of the circuit of FIG. 6.

On the other hand, a circuit example of the frequency discriminator circuit 130 is shown in FIG. 6, and will be explained with the operation waveform of FIG. 7. FIG. 6 shows an internal circuit of the frequency discriminator circuit 130, in which numerals 61, 62, 63 designate a T-type flip-flop having a reset terminal, and numeral 64 a RS-type flip-flop. The terminal K of the frequency discriminator circuit 130 is impressed with an oscillation signal from the output terminal K of the oscillation circuit 120. Also, the terminal N is supplied with the single-phase voltage of the armature winding 11, which voltage is not generated as long as the generator is stationary. In the case where the voltage waveform (e) of FIG. 7 is applied to the terminal K, the waveform (h) produced from three stages of T-type flip-flops in series takes a form shown in FIG. 7(h) which is inverted for each four input pulses. The output of the RS-type flip-flop 64 is held once the waveform (h) rises. In this way, when generation is not going on, the terminal M continues to produce a "1" output. In FIG. 3, a logic selection circuit including the AND gates 142, 143, the OR gate 144 and the NOT gate 141 causes the output L of the oscillation circuit 120 to be applied to the gate terminal P of the power MOS FET 101. As a result, the power MOS FET 101 turns on and off in response to the on-off signal of duty cycle of one fourth shown in FIG. 5(g). The average value of the field current flowing in the field winding 12 is then reduced to about one-fourth of the value when the power MOS FET is 100% on, as in the embodiment of FIG. 1. In the case of the generator mounted on vehicles such as an automobile, in particular, the driver is not always well aware of the operation of the engine and the charging generator thereof and may leave the key switch 3 on, thereby leading to an increase in the discharge from the storage battery 2 to an extent that cannot be overlooked. The exciting current (initial exciting current) of about 0.5 A is sufficient for starting the engine with a charging generator of about 12V, 60A, and in the aforementioned circuit, the current of 3 A×¼=1.2 A flows in the field winding 12, if the rating of the winding is 3 A. A sufficient magnetmotive force is thus secured for starting the generator.

When the generator starts generation, a voltage is generated in the armature winding 12 and a waveform as shown in FIG. 2(a) appears at the terminal P. With the rise of the voltage of the terminal P, the frequency discriminator circuit 130 of FIG. 6 is reset, and the output M thereof drops to "0". In this circuit, assuming that the basic oscillation period of the oscillation circuit 120 is $T_K$, and the period of the voltage at the terminal P is $T_P$, the conditions for holding the output at the terminal M continuously at "1" are that $$T_P > 4 \cdot T_K \tag{3}$$

where $T_P$ is expressed by the following formula:

$$T_P = \frac{60 \cdot 2}{N \cdot Pl} \text{ (secs)} \tag{4}$$

and N is the rotational speed in terms of r.p.m of the generator, and Pl the number of poles of the generator. If the equation (4) is substituted into equation (3), $$N < \frac{30}{T_K \cdot P} \text{ (r.p.m.)} \tag{5}$$

Substituting 12 for the number of poles P as is common for the charging generator of automobiles, and 10 msec for $T_K$, then N smaller than 250 r.p.m is obtained. When the rotational speed of the generator is more than 250 r.p.m, no output appears at the terminal M, so that the output at the NOT gate 141 in FIG. 3 rises to "1", and therefore the signal at the output $\overline{Q}$ of the D-type flip-flop 103 is transmitted to the gate of the power MOS FET 101. As a consequence, the output voltage of the generator is regulated to a constant value by the same operation as in the embodiment shown in FIG. 1.

According to the present embodiment, the initial exciting current discharged through the field winding 12 from the storage battery 2 when the generator is stationary can be limited to an appropriate value, and therefore a meaningless energy loss is prevented. In this embodiment the on duty factor for initial excitation is set 25%, which may be replaced to 20% or 10% or other lower values depending on the magnetic circuit or the like of the generator. Also, instead of the frequency discriminator circuit 130 used in this embodiment for detecting the operation of generation, the smoothing circuit including the resistor 111 and the capacitor 105 used in the embodiment of FIG. 1 may be employed for detecting the presence or absence of a generation voltage.

It will thus be understood from the foregoing description that according to the present invention, a power element for controlling the field current of the generator is switched in the bottom of the ripple of the output voltage of the generator, and therefore the amount of generation of the switching surge current is reduced. Specifically, the system according to the present invention minimizes the amount of current cutoff expressed by dI/dt in the equation below giving the counter-electromotive force generated usually in the inductance L.

$$V = -L \cdot dI/dt \tag{6}$$

Therefore radio troubles caused by generation of a surge voltage like radio noises are reduced.

I claim:

1. A voltage regulation system for an automotive charging generator comprising an armature winding, a field winding for supplying magnetic fluxes to said armature winding, a rectifier for converting the AC output voltage of said armature winding linearly, switching means connected in series with said field winding for turning on and off the field current, a storage battery charged by the output of the rectifier, and voltage detection means for detecting the voltage applied to the storage battery so as to turn on the switching means when the voltage thus detected is lower than a voltage set in advance and turn off said switching means when the voltage applied to the storage battery is higher than said set voltage, wherein said voltage detection means comprises comparing means for comparing the voltage of said storage battery with a first reference voltage, and a bistable means coupled to said comparing means and responsive to an input signal and a clock signal, corresponding to the AC output voltage generated from said armature winding, for outputting an output signal corresponding to one of said input signal and its complement synchronously with the clock signal, said bistable means holding said output signal until the next clock signal is inputted wherein said switching means turns on and off at a time synchronous with the bottom of the AC output voltage.

2. A voltage regulation system according to claim 1, wherein said bistable means comprises a D-type flip-flop and wherein said D-type flip-flop including a complement output coupled to said switching means.

3. A voltage regulation system according to claim 2, wherein said comparing means includes initialization means for effecting the turning on of said switching means when a selected phase of the output voltage of said armature winding and the charging voltage of said storage battery is lower than a predetermined voltage.

4. A voltage regulation system according to claim 2, wherein said comparing means includes frequency discriminating means for effecting, together with said bistable means, the turning on of said switching means when the frequency of a signal synchronous with the bottom of said AC output is lower than a predetermined vale.

5. A voltage regulation system according to claim 2, wherein said comparing means includes a group of C-MOS elements and a constant voltage circuit for applying a constant voltage to the power terminals of said C-MOS elements, wherein the threshold voltage $V_{th}$ of said C-MOS elements which is about one-half of the voltage of the constant-voltage circuit is used as said reference voltage.

6. A voltage regulation system according to claim 2, wherein said initialization means includes a group of C-MOS elements and a constant voltage circuit for applying a constant voltage to the power terminals of said C-MOS elements, wherein the threshold voltage $V_{th}$ of said C-MOS elements which is about one-half of the voltage of the constant-voltage circuit is used as said reference voltage.

7. A voltage regulation system according to claim 3, wherein said frequency discriminating means includes a group of C-MOS elements and a constant voltage circuit for applying a constant voltage to the power terminals of said C-MOS elements, wherein the threshold voltage $V_{th}$ of said C-MOS elements which is about one-half of the voltage of the constant-voltage circuit is used as said reference voltage.

8. A voltage regulation system according to claim 7, wherein said switching means comprises a MOSFET.

9. A voltage regulation system for an automotive charging generator comprising an armature winding, a field winding for supplying magnetic fluxes to said armature winding, a rectifier for converting the AC output voltage of said armature winding linearly, switching means connected in series with said field winding for turning on and off the field current, a storage battery charged by the output of the rectifier, and voltage detection means for detecting the voltage applied to the storage battery so as to turn on the switching means when the voltage thus detected is lower than a voltage set in advance and turn off said switching means when the voltage applied to the storage battery is higher than said set voltage, wherein said voltage detection means includes a first means which compares the voltage of the storage battery with a first reference voltage and a bistable means, coupled to said first means, for providing a control signal for turning on and off the switching means at a time point synchronous with the bottom of the AC output voltage in accordance with the result of said comparison.

10. A voltage regulation system according to claim 9, wherein said first means includes initialization means for effecting the turning on of said switching means when a selected phase of the output voltage of said armature winding and the charging voltage of said storage battery is lower than a predetermined voltage.

11. A voltage regulation system according to claim 9, wherein said first means includes frequency discriminating means for effecting the turning on of said switching means when the frequency of a signal synchronous with the bottom of said AC output is lower than a predetermined value.

12. A voltage regulation system according to claim 9, wherein said first means includes a group of C-MOS elements and a constant voltage circuit for applying a constant voltage to the power terminals of said C-MOS elements, wherein the threshold voltage $V_{th}$ of said C-MOS elements which is about one-half of the voltage of the constant-voltage circuit is used as said reference voltage.

13. A voltage regulation system according to claim 10, wherein said initialization means includes a group of C-MOS elements and a constant voltage circuit for applying a constant voltage to the power terminals of said C-MOS elements, wherein threshold voltage $V_{th}$ of said C-MOS elements which is about one-half of the voltage of the constant-voltage circuit is used as said reference voltage.

14. A voltage regulation system according to claim 11, wherein said frequency discriminating means includes a group of C-MOS elements and a constant voltage circuit for applying a constant voltage to the power terminals of said C-MOS elements, wherein the threshold voltage $V_{th}$ of said C-MOS elements which is about one-half of the voltage of the constant-voltage circuit is used as said reference voltage.

* * * * *